United States Patent
O'Gwynn

(10) Patent No.: US 10,756,972 B1
(45) Date of Patent: Aug. 25, 2020

(54) SYSTEM AND METHOD FOR CONFIGURING COMMUNICATION DEVICES

(71) Applicant: HM Electronics, Inc., Poway, CA (US)

(72) Inventor: David O'Gwynn, Ramona, CA (US)

(73) Assignee: HM Electronics, Inc., Carlsbad, CA (US)

( * ) Notice: Subject to any disclaimer, the term of this patent is extended or adjusted under 35 U.S.C. 154(b) by 0 days.

(21) Appl. No.: 16/750,303

(22) Filed: Jan. 23, 2020

Related U.S. Application Data

(63) Continuation of application No. 16/676,178, filed on Nov. 6, 2019, which is a continuation of application No. 16/380,567, filed on Apr. 10, 2019, now Pat. No. 10,484,241, which is a continuation of application No. 15/878,290, filed on Jan. 23, 2018, now Pat. No. 10,263,843, which is a continuation of application No. 15/203,462, filed on Jul. 6, 2016, now Pat. No. 9,917,731, which is a continuation of application No. 14/662,027, filed on Mar. 18, 2015, now Pat. No. 9,408,022.

(51) Int. Cl.
| | |
|---|---|
| *H04L 12/24* | (2006.01) |
| *H04W 4/029* | (2018.01) |
| *H04W 4/80* | (2018.01) |
| *H04W 4/02* | (2018.01) |
| *H04W 76/15* | (2018.01) |
| *H04W 88/06* | (2009.01) |

(52) U.S. Cl.
CPC ........... *H04L 41/0816* (2013.01); *H04W 4/02* (2013.01); *H04W 4/029* (2018.02); *H04W 4/80* (2018.02); *H04W 76/15* (2018.02); *H04W 88/06* (2013.01)

(58) Field of Classification Search
CPC ...... H04L 41/0816; H04W 4/02; H04W 4/80; H04W 76/15
USPC ............................................. 455/41.1, 552.1
See application file for complete search history.

(56) References Cited

U.S. PATENT DOCUMENTS

| | | | |
|---|---|---|---|
| 6,108,560 | A | 8/2000 | Navaro |
| 6,421,527 | B1 | 7/2002 | DeMartin |
| 8,244,179 | B2 | 8/2012 | Dua |
| 8,265,255 | B1 | 9/2012 | Abrishami |
| 8,374,858 | B2 | 2/2013 | Fejzo |
| 8,515,412 | B2 | 8/2013 | Choi-Grogan |
| 8,553,865 | B2 | 10/2013 | Menard |
| 9,042,349 | B1 | 5/2015 | Oroskar |
| 9,408,022 | B1 | 8/2016 | O'Gwynn |
| 9,484,041 | B1 | 11/2016 | O'Gwynn |

(Continued)

FOREIGN PATENT DOCUMENTS

| | | |
|---|---|---|
| EP | 1137209 | 9/2001 |
| EP | 1915878 | 8/2013 |
| EP | 2418780 | 5/2014 |

*Primary Examiner* — Ayodeji O Ayotunde
(74) *Attorney, Agent, or Firm* — Esplin & Associates, PC

(57) ABSTRACT

A communication system that includes a base unit and one or more end units that communicate over a primary communication link using a first communication protocol and a secondary communication link using a second protocol. The secondary communication link may be a shorter range communication link than the primary communication link. The secondary communication link may be used to transmit and receive registration information, configuration settings, and status information between the end units and the base unit.

22 Claims, 8 Drawing Sheets

(56) References Cited

U.S. PATENT DOCUMENTS

| | | |
|---|---|---|
| 9,917,731 B1 | 3/2018 | O'Gwynn |
| 10,263,843 B2 | 4/2019 | O'Gwynn |
| 10,484,241 B2 * | 11/2019 | O'Gwynn ............. H04W 4/029 |
| 2003/0063569 A1 | 4/2003 | Kalliokulju |
| 2006/0174015 A1 | 8/2006 | Arauz-Rosado |
| 2006/0258289 A1 | 11/2006 | Dua |
| 2014/0162558 A1 | 6/2014 | Dua |
| 2014/0273833 A1 | 9/2014 | McCormack |
| 2016/0171575 A1 | 6/2016 | Bowles |
| 2019/0238408 A1 | 8/2019 | O'Gwynn |

* cited by examiner

SYSTEM AND METHOD FOR CONFIGURING COMMUNICATION DEVICES

FIELD OF THE DISCLOSURE

This disclosure relates to communication devices that have a primary communication link and configuring the settings for the communication devices over a secondary communication link between the devices.

BACKGROUND

In communication systems that are configured to facilitate communication between multiple users, multiple communication device types, and/or between units/stations having different communication tasks, the communication devices associated with the users and/or tasks (communication end units), are typically configured individually for the particular user or the particular task. End units seldom comprise of multiple input controls to facilitate easy configuration of the end units, e.g. due to size restrictions. Instead, end units typically come with a certain number of sets of configuration settings. The end units also typically only have a few control input buttons, such as the on/off button and/or volume buttons. The sets of configuration settings may be selected on the end units by pressing the few buttons in a pre-specified pattern and/or length of time.

Selecting the configuration settings for end units is typically done on a very occasional or intermittent basis. Consequently, users do not typically remember how to set the particular configuration setting for their end units. This may result in delay in registering the end units and considerable frustration for the user. The user typically resorts to calling the customer services department of their communication device provider.

Communication systems often include a base station (hereinafter referred to as a base unit) and one or more portable end units. The portable end units are typically registered to a particular base unit, or a particular group of base units. When registering an end unit to a base unit, it is typically necessary to place both the base unit and the end unit into registration modes. To put the end unit into a registration mode it may be necessary to press a button on the end unit for a certain period of time, and/or press a combination of buttons. Similar interaction with the end unit may be required when changing configuration settings of the end unit, such as the function(s) of specific button(s), microphone gain, automatic transmission of data, etc.

Some communication systems require that the end units be plugged into the base unit to register and set the configuration settings for the end unit. Typically, the base unit, in such systems, includes configuration settings for the end unit, by virtue of the base unit being larger, including additional functionality compared to the end unit, and having, e.g., an alphanumeric and/or graphical user interface. In some communication systems, configuration settings are communicated to the end units from the base unit over the standard communication links between the end units and the base unit. Such systems would require additional radio bandwidth compared to that used by the (wired) communications between the base unit and the end unit. Furthermore, it may be more challenging to change the configuration settings of the end unit when a new user is using the end unit, or if the user using the end unit transfers to a different role and/or task.

SUMMARY

One aspect of the disclosure relates to a communication system including one or more secondary communication link(s). The secondary communication link(s) may be between the end unit and the base unit. The secondary communication link(s) may be separate from a primary communication link between the end unit and the base unit. The primary communication link(s) typically transport the audio communications provided by the user through the end unit associated with the user to the base unit, and/or from the base unit to one or more intended end units.

The secondary communication link(s) may include a short range communication link. The secondary communication link(s) may use a low frequency magnetic induction path. The secondary communication link(s) may include a low frequency radio frequency identification (RFID) transponder in an end unit and a compatible reader in the base unit. When a short range antenna of the end unit and a short range antenna of the base unit are in close proximity, communication between the end unit and the base unit may be established. The base unit may recognize the end unit. The base unit may register the end unit. Registering the end unit to the base unit may facilitate audio communications and/or other information being transmitted between the base unit and the end unit over one or more primary communication links. When in close proximity, the base unit and the end unit may exchange information over the secondary communication link. The exchanged information may include configuration settings transferred from the base unit to the end unit. The exchanged information may include an identity, identifier, name, role, task, handle, and/or other reference that refers to, reflects, and/or represents a set of configuration settings. The exchanged information may include machine-readable instructions configured to cause the end unit to perform one or more functions.

One aspect of the present disclosure relates to a system for configuring communication devices. The system for configuring communication devices may include a first communication device. The first communication device may be configured to receive audio signals from a user. The first communication device may be configured to process audio signals into audio data and transmit the audio data from the user to one or more other devices. The first communication device may be configured to receive audio data from one or more other communication devices. The first communication device may be configured to process the audio data into audio signals and transmit audio signals to the user. The first communication device may be an end unit.

The first communication device may be configured to communicate over a primary communication link. The first communication device may be configured to communicate over a secondary communication link. The secondary communication link may be different from the primary communication link. The secondary communication link may be used for a different type of communication exchange than the primary communication link.

The primary communication link may be a long-range communication link. The primary communication link may be configured to facilitate the transmission of audio signals and/or other signals between the first communication device and the second communication device. The primary communication link may be a narrow-band communication link. The primary communication link may be a wide-band communication link. The primary communication link may be an analog communication link. The primary communication link may be a digital communication link.

The secondary communication link may be a short-range communication link. The secondary communication link may be one or more of an RFID communication link, a Bluetooth communication link, a near-field communication (NFC) link, and/or other short-range communication link.

The system for configuring communication devices may comprise a second and/or third communication device. The second and/or third communication device may be a primary communication device. The second and/or third communication device may be configured to assert some sort of control over other communication devices. The second and/or third communication device may assert control over the first communication device. The second and/or third communication device may be a base unit.

The second and/or third communication device may be configured to communicate with the first communication device. The second and/or third communication device may be configured to communicate with the first communication device over the primary communication link. The second and/or third communication device may be configured to communicate with the first communication device over the secondary communication link.

The second communication device may be configured to send identification communications. In some implementations, an identification communication may be an identification request. The second communication device may be configured to receive identification information, e.g. in response to an identification communication. The identification communications may be sent to communication devices including but not limited to the first communication device. The identification communications may be provided over the secondary communication link. The identification communications may be replied to by the first communication device when one or more of the secondary communication link components of the first communication device are brought into close proximity with the one or more secondary communication link components of the second communication device.

The second communication device may be configured to receive identification information, e.g. in response to an identification communication. The second communication device may be configured to receive identification information from the first communication device. The second communication device may be configured to receive identification information over the secondary communication link.

The second communication device may be configured to determine and/or obtain a set of configuration settings for communication devices, including but not limited to the first communication device. The obtained and/or determined set of configuration settings may be a desired set of configuration settings, e.g. as desired by a user. The obtained and/or determined set of configuration settings may be based on identification information, e.g. as received from the first communication device. The obtained and/or determined set of configuration settings may be based on user-selected settings. The obtained and/or determined set of configuration settings may be based on location information, including but not limited to information related to one or more locations of one or more communication devices. Obtainment and/or determination of a set of configuration settings may be responsive and/or subsequent to a determination that the first communication device has been configured to facilitate communication over the primary communication link, a determination that the first communication device has not yet been configured and/or registered to facilitate communication over the primary communication link, a determination that the first communication device is due to be configured and/or reconfigured to facilitate communication over the primary communication link, and/or other determinations.

The obtained and/or determined set of configuration settings may be based on user selected configuration information.

The second communication device may be configured to communicate, over the secondary communication link, the set of configuration settings to the first communication device. The second communication device may be configured to communicate, over the secondary communication link, information representing the set of configuration settings to the first communication device. The communication of the set of configuration settings to the first communication device may cause the first communication device to be configured in accordance with the set of configuration settings. The communication of the information representing the set of configuration settings to the first communication device may cause the first communication device to be configured in accordance with the set of configuration settings. Configuration of a communication device in accordance with a set of configuration settings may facilitate communication over the primary communication link, the secondary communication link, and/or other communication.

The second communication device may be configured to determine and/or obtain the set of current configuration settings for the first communication device. The second communication device may determine and/or obtain the set of current configuration settings for the first communication device in a number of ways. The second communication device may have a record of the settings and/or characteristics of the first communication device wherein the record may, by way of non-limiting example, be associated with identification information of the first communication device, and/or other information. For example, the second communication device may have electronic storage media containing a look-up table and cross-reference identification information, such as a user identity, a role of a user, a serial number or code, and/or other information related to a user and/or to the first communication device with the lookup table. The second communication device may obtain, from the first communication device, setting information that, when cross-referenced with a database, reveals a configuration type of the first communication device. The second communication device may obtain, from the first communication device, information associated with one or more settings and parameters for one or more settings.

Subsequent to obtaining and/or determining the set of current configuration settings, the second communication device may be configured to compare the current configuration settings of the first communication device with a desired set of configuration settings for the first communication device. Based on the comparison, the second communication device may be configured to determine one or more adjustments for a set of configuration settings for the first communication device. The second communication device may be configured to transmit the one or more adjustments to the first communication device. The transmission may occur over the secondary communication link. The transmitted one or more adjustments may cause the first communication device to be configured in accordance with the one or more adjustments.

The set of configuration settings for the first communication device may be obtained from selection and/or entry, e.g. at the second communication device, of the set of configuration settings for the first communication device.

The second communication device may be configured to receive selection and/or entry of sets of configuration settings for the first communication device. Selection and/or entry may comprise a user selecting an individual set of configuration settings from a plurality of sets of configuration settings. Selection and/or entry may comprise a user selecting and/or entering parameter information associated with one or more features of the first communication device. Selection and/or entry of a set of configuration settings for the first communication device may comprise using one or more secondary identifiers to facilitate determination of which of the sets of configuration settings for the first communication device to use. Selection and/or entry may comprise a user selecting and/or entering information representing one or more of an identity, identifier, name, role, task, handle, and/or other reference that refers to, reflects, and/or represents a user and/or is otherwise related to the user. Combinations of multiple selections and/or entries are considered within the scope of this disclosure. For example, a user may select and/or enter information that identifies the user. Alternatively, and/or simultaneously, for example, a user may select and/or enter information that refers to, reflects, and/or represents a role, task, and/or responsibility of the user.

The set of configuration settings for the first communication device may be determined based on one or more parameters of the first communication device. Identifying information associated with the first communication device may be obtained by the second communication device upon initiation of a communication link between the first and second communication devices.

The (desired) set of configuration settings for the first communication device may be determined based on the sets of configuration settings for other communication devices. The other communication devices may have been previously configured. Information associated with the set of configuration settings for the other communication devices may be stored on electronic storage media associated with the second communication device. Based on the configuration settings of the other communication devices stored on the electronic storage media associated with the second communication device, the second communication device may determine a set of configuration settings for the first communication device. Such a determined set of configuration settings for the first communication device may be the same as, similar to, and/or complimentary to the sets of configuration settings for the other communication devices.

The second communication device may have one or more remote communication devices for communicating over the secondary communication link. The one or more remote communication devices may have associated location information. The set of configuration settings for the first communication device may be determined based on the location information of the one or more remote communication devices. For example, in a fast food restaurant environment, users may operate multiple stations in the restaurant. The various stations may have different functions and require different communication abilities associated with those functions. For example, one station may be to take orders from customers, while another station may be to liaise with other staff members. A remote secondary communication device may be located at a particular station. A user may bring the secondary communication link equipment of the first communication device in close proximity to the remote secondary communication device at a particular station. By virtue of the remote secondary communication device's location at the particular station, sets of configuration settings may be determined for the first communication device based on the location information of the remove secondary communication device.

Another aspect of the present disclosure relates to a method for configuring communication devices. The method may be implemented on one or more physical computer processors configured by machine-readable instructions to process the method. The method may include providing a first communication device. The first communication device may be configured to communicate over a primary communication link and a secondary communication link different from the primary communication link. The second communication device may be configured to communicate with the first communication device over the primary communication link and the secondary communication link. The second communication device may be configured to send an identification communication to the first communication device over the secondary communication link. The second communication device may be configured to receive identification information from the first communication device over the secondary communication link. The second communication device may be configured to obtain and/or determine a desired set of configuration settings for the first communication device, e.g. based on the received identification information. The second communication device may be configured to communicate the desired set of configuration settings to the first communication device, over the secondary communication link. The second communication device may be configured to communicate information representing the desired set of configuration settings to the first communication device, over the secondary communication link. Communication from the second communication device to the first communication device may cause the first communication device to be configured to facilitate communication, e.g. over the primary communication link, in accordance with the desired set of configuration settings.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
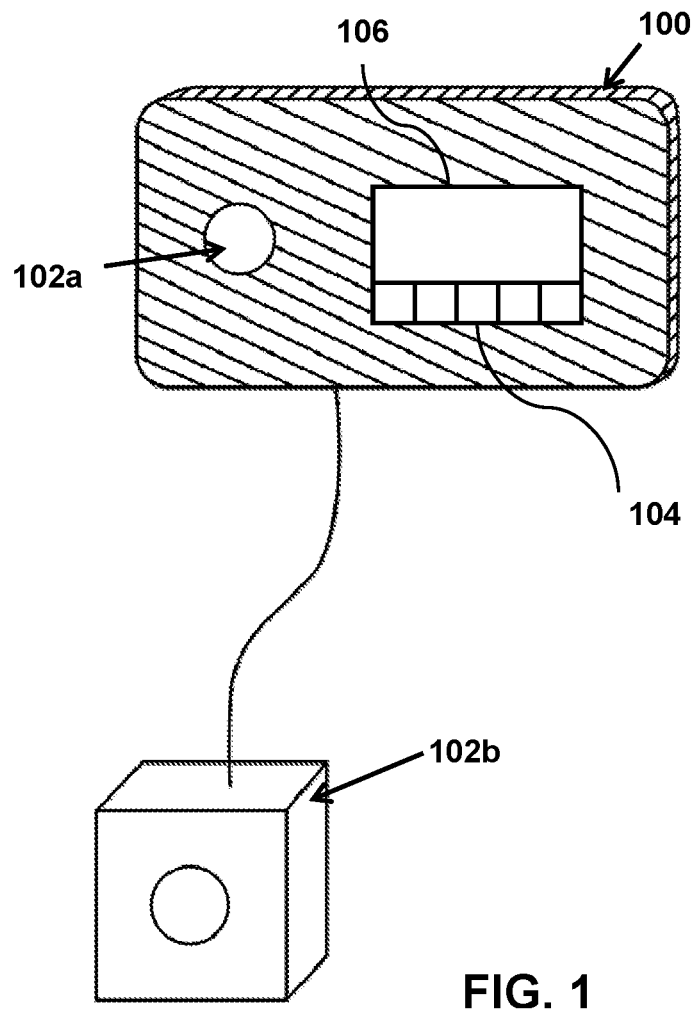
FIG. 1 illustrates a second communication device, in accordance with one or more implementations of the present disclosure.

FIG. 1 illustrates a second communication device 100, in accordance with one or more implementations of the present disclosure. The second communication device 100 may be a base unit of a communication system. The second communication device 100 may comprise secondary communication link elements 102a/102b. The secondary communication link elements 102a/102b may comprise one or more of a transmitter, a receiver, an antenna, and/or other secondary communication elements. The secondary communication link may be configured to communicate with other devices using radio-frequency identification (RFID), Bluetooth, near-field communication, and/or other short-range communication protocols. The secondary communication link elements 102a/102b may include powered secondary communication link elements 102a/102b.

In one example, the secondary communication link may communicate using the RFID protocol. The secondary communication elements may be configured to communicate using many different frequencies. Such frequencies may include low frequency RFID, such as 100 kHz-150 kHz. Low-frequency RFID may be used when transponders, or transceivers, used in a secondary communication link system are small and where transmission range may be well controlled. In some implementations, the coupling between an RFID reader and an RFID transponder may be magnetic in nature, ensuring that, to operate, the RFID reader and the RFID transponder are in close proximity to one another.

The first communication device 100 may include one or more secondary communication link element(s) 102a and/or remote secondary communication link element(s) 102b. The remote secondary communication link element(s) 102b may be in communication with the first communication device through an electrically wired connection or wireless connection, an optical connection and/or other connection types. Having remote secondary communication link element(s) 102b separate from the first communication device 100 may be advantageous when it is undesirable to place the first communication device 100 in reach of users.

Figure 2:
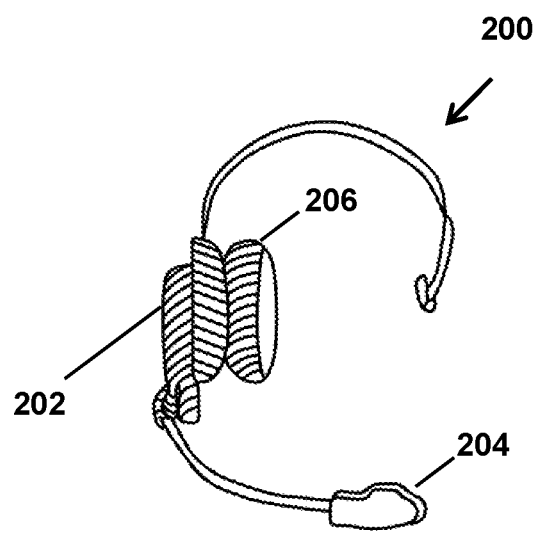
FIG. 2 illustrates a first communication device, in accordance with one or more implementations of the present disclosure.

FIG. 2 illustrates a first communication device 200, in accordance with one or more implementations of the present disclosure. The first communication device 200 may be an end unit of a communication system. The first communication device 200 may include one or more secondary communication link elements 202. The secondary communication link elements 202 may be similar to the secondary communication link element 102a of the second communication device 100 shown in FIG. 1. The secondary communication link elements 202 of the second communication device 200 may be powered or non-powered elements. For example, the secondary communication link elements 202 may include passive communication elements, such as a passive RFID transponder.

The first communication device 100 may be configured to receive audio signals from a user. The audio signals may be received by one or more microphones 204. The first communication device 100 may be configured to process audio signals into audio data and transmit the audio data from the user to one or more other devices. The first communication device 200 may be configured to receive audio data from one or more other communication devices. The first communication device 200 may be configured to process the audio data into audio signals and transmit audio signals to the user. The first communication device 200 may be configured to transmit and/or play back audio signals to the user via one or more speakers 206.

Figure 3:
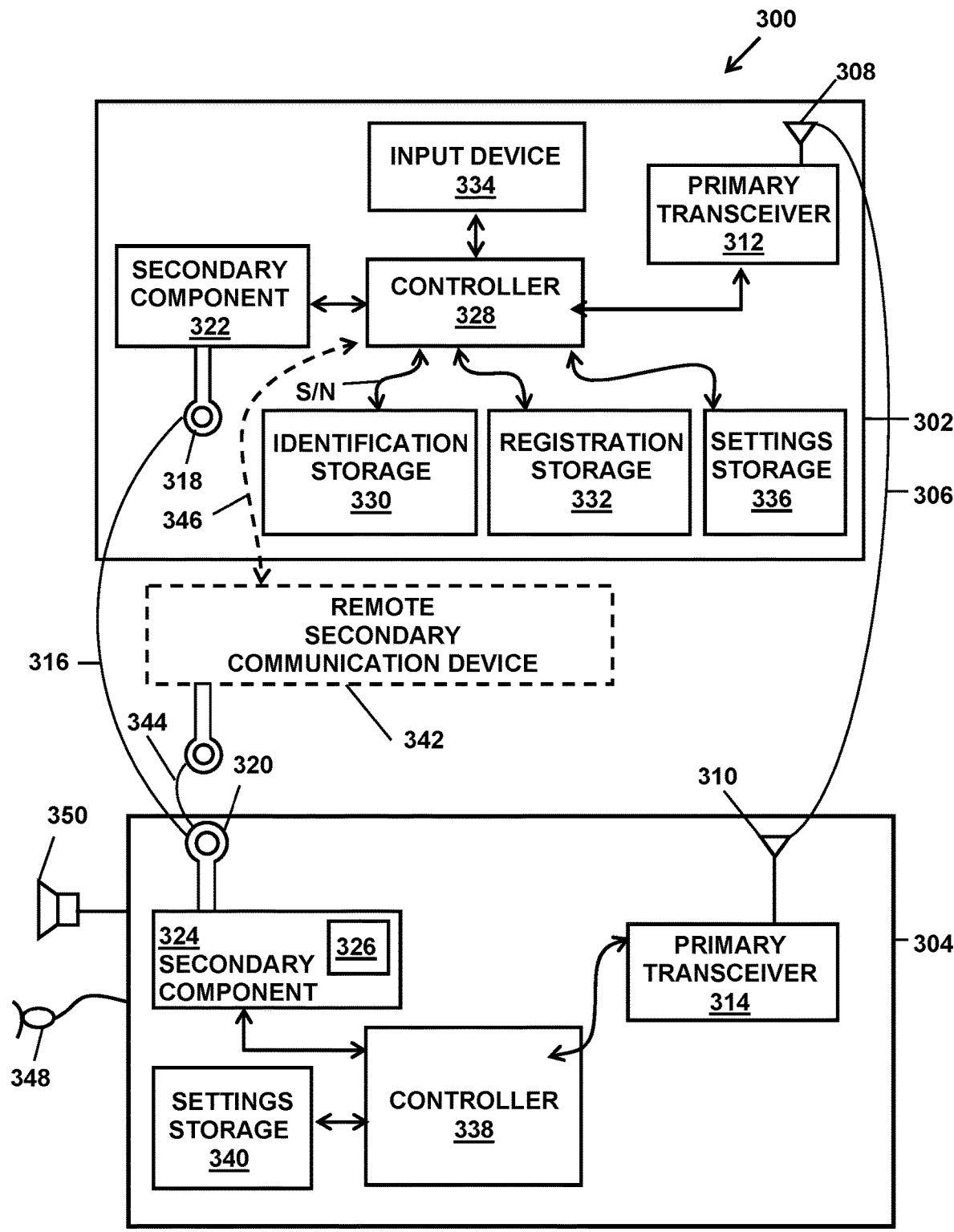
FIG. 3 is a schematic illustration of a first communication device and a second communication device, in accordance with one or more implementations of the present disclosure.

FIG. 3 is a schematic illustration 300 of a first communication device 304 and a second communication device 302, in accordance with one or more implementations of the present disclosure. The first communication device 304 and the second communication device 302 may be configured to communicate over a primary communication link 306. The first communication device 304 may comprise a primary communication antenna 310 configured to transmit and/or receive communications over the primary communication link 306. The second communication device 302 may comprise a primary communication antenna 308 configured to transmit and/or receive communications over the primary communication link 306. The first communication device 304 may include one or more transceivers 314 configured to facilitate transmission and/or receipt over the primary communication link 306. Similarly, the second communication device 302 may include one or more transceivers 312 configured to facilitate transmission and/or receipt over the primary communication link 306.

The primary communication link 306 may be a longer-range communication link. The transceiver 312 of the second communication device 302 and the transceiver 314 of the first communication device 304 may be configured to transmit and/or receive communications over the primary communication link 306 over a distance of several hundred feet or more. The primary communication link 306 may be configured to facilitate the transmission of radio signals, optical signals, electronic signals, and/or other signals between the first communication device 304 and the second communication device 302. The primary communication link 306 may be a narrow-band, wideband, broadband and/or other communication link. The primary communication link 306 may be an analog communication link, a digital communication link and/or other type of communication link.

The first communication device 304 and the second communication device 302 may be configured to communicate over a secondary communication link 316. The secondary communication link 316 may be different (e.g. different type of data, different format of data, different electrical characteristics of data, etc.) from the primary communication link 306. The secondary communication link 316 may be a short-range communication link. The secondary communication link 316 may be one or more of an RFID communication link, a Bluetooth communication link, a near-field communication link, and/or other short-range communication link. As used herein, any examples of a particular communication protocol are intended to be illustrative. Other communication protocols, such as Bluetooth, near-field communication, and/or other communication protocols are contemplated herein.

The second communication device 302 and the first communication device 304 may comprise secondary communication link elements to facilitate communication over the secondary communication link. The second communication device 302 may comprise a secondary communication link antenna 318. The first communication device 304 may comprise a secondary communication link antenna 320. The second communication device 302 may include one or more of, a secondary communication link transceiver, a secondary communication link receiver, a secondary communication link transponder, a secondary communication link reader, and/or other secondary communication component configured to facilitate receipt and/or transmission of data over the secondary communication link 316.

The first communication device 304 may include a secondary communication link component 324. In some implementations, secondary communication link component 324 may include a transponder. In some implementations, secondary communication link component 324 may include a transceiver. In some implementations, the secondary communication link component 324, of the first communication device 304, may include identification information 326 associated with an identification of the secondary communication link component 324.

The second communication device 302 may be a primary communication device. The second communication device 302 may be a base unit of a communication system. The second communication device 302 may be configured to assert some form of control and/or administration over one or more first communication devices 304.

The second communication device 302 may be configured to exchange configuration and/or registration information with the first communication device 304, e.g. to register the first communication device 304 to the second communication device 302. Responsive to the secondary communication link antenna 320 of the first communication device 304 being brought within close proximity of the secondary communication link antenna 318 of the second communication device 302, the secondary communication link component 322 may be configured to detect the presence of the secondary communication link component 324 of the first communication device 304. In some implementations, secondary communication link component 322 may include a transponder. In some implementations, secondary communication link component 322 may include a transceiver. In some implementations, secondary communication link component 322 may include an RFID reader. In response to detecting the presence of the secondary communication link component 324, the secondary communication link component 322, of the second communication device 302, may receive identification information 326 of the secondary communication link component 324. The second communication device 302 may comprise a controller 328. The controller 328 may be configured to identify an identity of the first communication device 304 based on the received identification information 326. The second communication device 302 may comprise electronic storage media. The electronic storage media may be configured to store identification information 330 of one or more first communication devices 304. The stored identification information 330 may include a record of individual ones of the one or more first communication devices 304 and their corresponding identification information. The controller 328 of the second communication device 302 may be configured to correlate the received identification information 326 with the stored identification information 330.

The controller 328 may be configured to register the first communication device 304 based on the identification information 326 of the first communication device 304. The registration information of first communication device(s) registered to the second communication device 302 may be stored on the second communication device 302, such as in registration storage 332, and/or in other electronic storage media.

In some implementations the secondary communication link component 324 of the first communication device 304 may be in an idle state prior to receiving an identification communication and/or a read communication from the secondary communication link component 322 of the second communication device 302. In some implementations, a read communication may be a read request. In response to receiving a communication from the secondary communication link component 322 of the second communication device 302, the secondary communication link component 324 may provide identification information 326 to the secondary communication link component 322 of the second communication device 302. The controller 328 of the second communication device 302 may be configured to determine whether the identification information 326 corresponds to identification information stored on the second communication device 302, such as in registration storage 332. In response to a determination that the identification information 326 does not correspond to identification information stored on the second communication device 302, the controller 328 may be configured to register the first communication device 304 to the second communication device 302.

In some implementations, controller 328 of the second communication device 302 may be configured to receive a configuration communication from the first communication device 304. In some implementations, a configuration communication may be a configuration request. The configuration communication may occur automatically as a consequence of the first communication device 302 being in proximity to the secondary communication link antenna 318 of the second communication device 302. Controller 328 of the second communication device 302 may be configured to receive one or more user selected configuration settings, e.g. through an input device, a network connection, and/or through another mechanisms. The second communication device 302 may comprise an input device 334. The input device 334 may include one or more of buttons 104 (as shown in FIG. 1), a touch screen 106 (as shown in FIG. 1), and/or other input devices. The input device 334 may be configured to facilitate selection and/or entry by a user of a pre-stored set of configuration settings for the first communication device 304. Pre-stored sets of configuration settings may be stored on electronic storage media in the second communication device 302, such as in settings storage 336.

The second communication device 302 may be configured to communicate, over the secondary communication link 316, a (desired) set of configuration settings to the first communication device 304. The first communication device 304 may comprise a controller 338. The controller 338 may be configured to configure the first communication device 304 in accordance with the transmitted configuration settings. The second communication device 302 may be configured to communicate one or more configuration settings automatically as a consequence of the first communication device 302 being in proximity to the secondary communication link antenna 318 of the second communication device 302.

In some implementations, the first communication device 304 may have one or more sets of configuration settings stored on electronic storage media, such as in settings storage 340. The sets of configuration settings in the settings storage 340 in the first communication device 304 may correlate to one or more sets of configuration settings in settings storage 336 in the second communication device 302. Each set of configuration settings may have associated configuration identification information. The second communication device 302 may be configured to transmit the configuration identification information to the first communication device 304. The controller 338 may be configured to select the set of configuration settings for the first communication device 304 from the settings storage 340.

In some implementations, the second communication device 302 may be configured to obtain the current configuration settings of the first communication device 304. The controller 328 of the second communication device 302 may be configured to determine a difference between the obtained current set of configuration settings and the desired set of configuration settings, e.g. as selected and/or entered by the user. The controller 328 of the second communication device 302 may be configured to compare the current set of configuration settings and the desired set of configuration settings, e.g. as selected and/or entered by the user. The controller 328 may be configured to determine a set of updated configuration settings to provide to the first communication device 304. The controller 328 may be configured to determine one or more adjustments for the set of current configuration settings, e.g. based on a comparison as described in this disclosure. The second communication device 302 may be configured to transmit the updated set of configuration settings to the first communication device 304 over the secondary communication link 316. The second communication device 302 may be configured to transmit the one or more adjustments to the first communication device 304 over the secondary communication link 316.

The controller 328 may be configured to identify one or more parameters of the first communication device 304 based on information provided in the identification communication from the first communication device 304. Based on the one or more parameters of the first communication device 304, the controller 328 of the second communication device 302 may be configured to determine one or more sets of configuration settings from settings storage 336 based on the obtained parameters.

One or more first communication devices 304 may be registered to the second communication device 302. The controller 328 may be configured to determine a set of configuration settings the first communication device 304 based on the configuration settings of previously registered communication devices, such that the determined set of configuration settings may compliment the configurations of the other communication devices.

In some implementations, the second communication device 302 may request status information from the first communication device 304. The status information associated with the first communication device 304 may include information such as battery charge, battery life, diagnostic information and/or other status information associated with the first communication device 304.

In some implementations, information transmitted between the second communication device 302 and the first communication device 304, over the secondary communication link 316, may be encrypted. The controller 328 of the second communication device 302, and the controller 338 of the first communication device 304 may be configured to encrypt and/or decrypt the information transmitted over the secondary communication link 316.

The second communication device 302 may include one or more remote secondary communication devices 342. The remote secondary communication device(s) 342 may be configured to communicate with one or more first communication devices 304 over a secondary communication link 344. The remote secondary communication device(s) 342 may be configured to communicate with the second communication device 302 over a remote communication link 346. The remote communication link 346 may be a wired communication link, a wireless communication link, a radio-frequency communication link, an optical communication link, and/or other communication link. The remote secondary communication device(s) 342 may include location information associated with the remote secondary communication device(s) 342. The second communication device 302 may be configured to determine sets of configuration information based on the location information associated with the remote secondary communication device 342. The location information associated with the remote secondary communication device 342 may be associated with one or more functions of a user at the location associated with the remote secondary communication device 342. The second communication device 302 may include internal and/or remote secondary communication devices 342.

The first communication device 304 may include one or more microphones 348. The first communication device 304 may include one or more speakers 350.

The set of configuration settings for a communication device may include settings to control the function(s) of one or more user operable buttons on device 304, settings that determine, reflect, and/or represent the role of the user within the organization, settings that control how indicators or displays on device 304 operate, settings that determine the language of voice prompts delivered to the user through speaker 350, settings that determine the volume of sounds provided by speaker 350, settings that determine the level of signals expected from microphone 348, settings that determine whether device 304 is allowed to communicate over a telephone system, settings that determine whether transmissions from device 304 are continuous or intermittent, settings that control audio processing options, settings that control audio noise suppression, settings that control transmitter frequency band, settings that indicate the type of battery used, settings that control how long the transmitter can remain on continuously, settings that control which other communication devices device 304 can communicate with, and other settings.

Referring to FIG. 2, the first communication device 200 may include secondary communication link elements 202. The secondary communication link elements 202 may be an interchangeable unit. The secondary communication link elements 202 may be associated with one or more functions. In response to the first communication device 202 communicating across a secondary communication link with a second communication device, the second communication device may provide a set of configuration settings to the first communication device 202 associated with the interchangeable unit installed on the first communication device 202.

Figure 4:
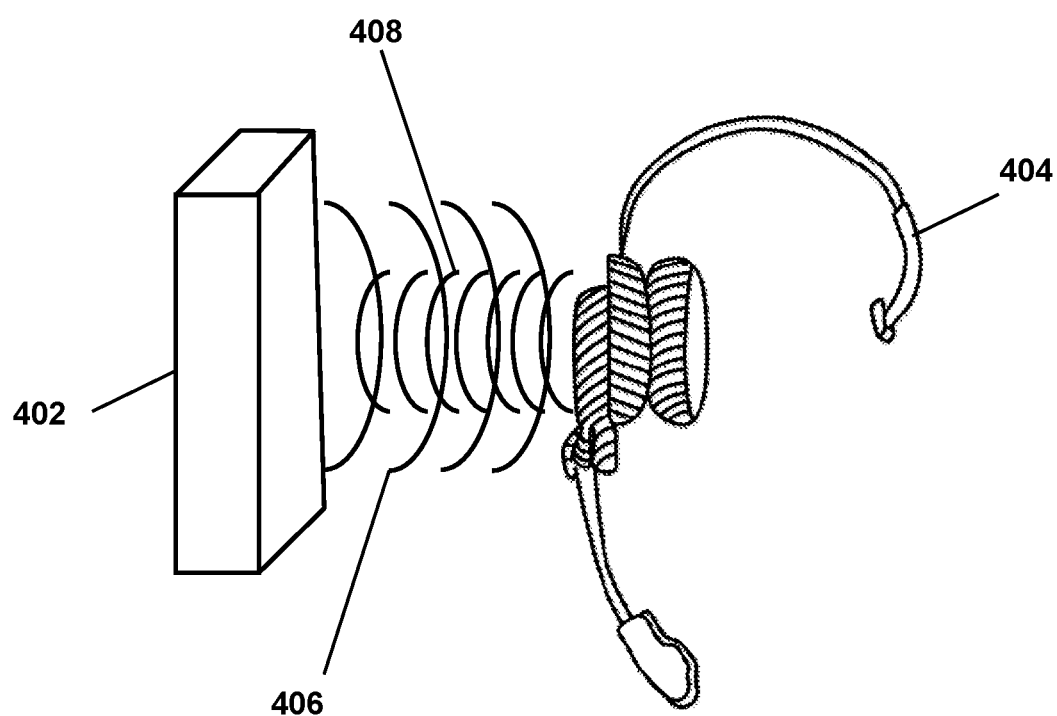
FIG. 4 illustrates a first communication device and a second communication device communicating over a secondary communication link, in accordance with one or more implementations of the present disclosure.

FIG. 4 illustrates a first communication device 404 and a second communication device 402 communicating over a secondary communication link, in accordance with one or more implementations of the present disclosure. The first communication device 404 may include a secondary communication transponder and/or transceiver. The secondary communication transponder may be passive. The second communication device 402 may send a read communication 406. In some implementations, a read communication may be or include an identification communication as described elsewhere in this disclosure. In response to the read communication 406 the first communication device 404 may be send information 408 about the first communication device 404.

FIGS. 5A-5D are example illustrations of the signals between a first communication device and a second communication device communicating over a secondary communication link, in accordance with one or more implementations of the present disclosure.

Figure 5A:
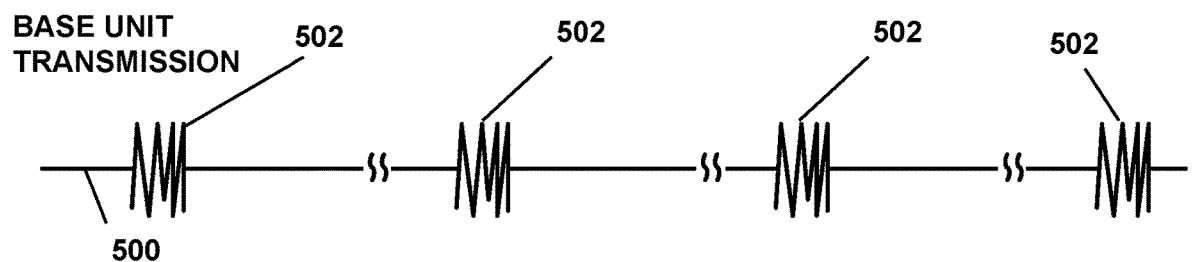
FIGS. 5A-5D are example illustrations of the signals between a first communication device and a second communication device communicating over a secondary communication link, in accordance with one or more implementations of the present disclosure.

FIG. 5A illustrates a situation where the second communication device, or base unit, transmits read communications until the receipt of a response from a first communication device, or end unit. The second communication device may transmit a signal 500. The signal 500 may comprise of discrete read communication signals 502. Such signal may be transmitted continuously and/or intermittently until the base unit receives a response to the transmitted read communication signal 502. In some implementations, a read communication may be or include an identification communication as described elsewhere in this disclosure.

Figure 5B:
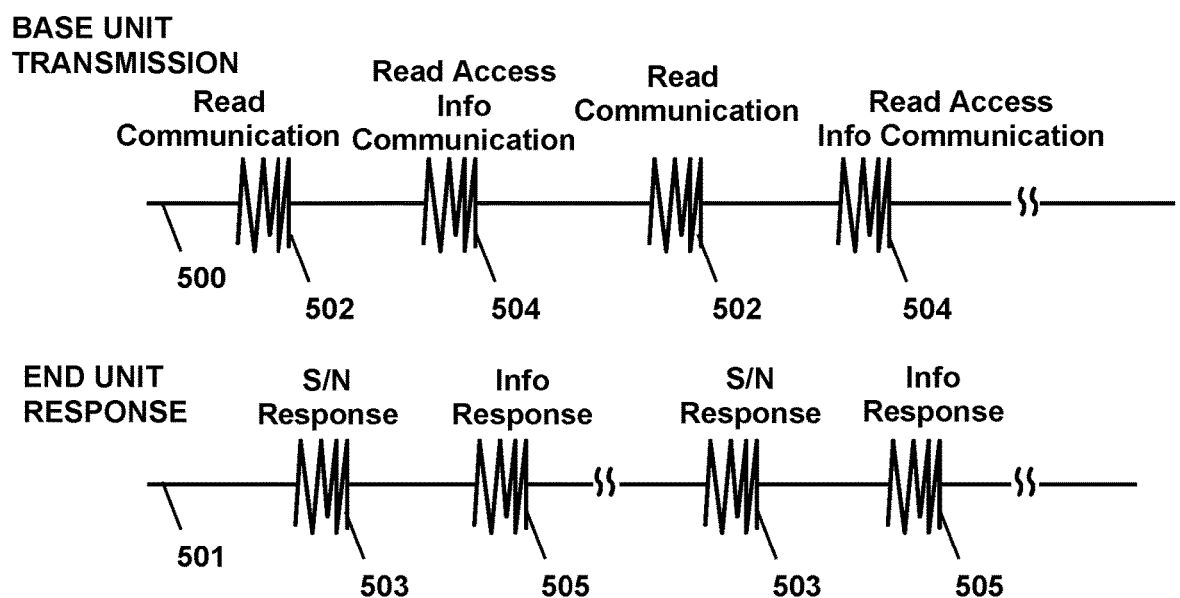

FIG. 5B illustrates a situation in which a first communication device, or end unit, responds to a signal transmitted by the second communication device, or base unit. The situation illustrated in FIG. 5B includes a situation where the end unit is invalid for the base unit. Signal 500 may be transmitted by a second communication device, such as a communication system base unit, responsive to being in proximity to a first communication device, such as a communication system end unit. FIG. 5B also illustrates a signal 501 transmitted by a first communication device. The signal 501 from the first communication device may include a response signal 503, in response to receipt of the read communication 502 from the second communication device. In response to the response signal 503 from the first communication device, the second communication device may transmit a read access information communication signal 504. In response to the read access information communication signal 504 the first communication device may transmit a response signal 505. In response to the response signal 505 being invalid, the sequence may repeat.

Figure 5C:
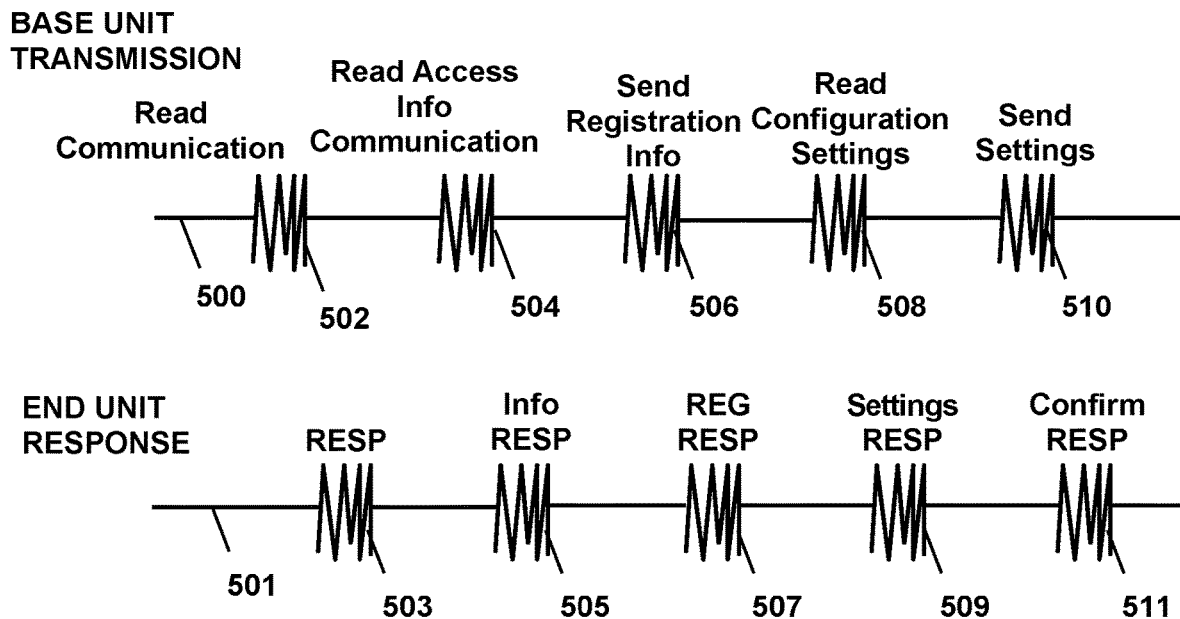

FIG. 5C illustrates a situation in which a first communication device, such as an end unit, is proximate to a second communication device, such as a base unit, and where the first communication device is not registered with the second communication device. The second communication device, or base unit, may transmit a read communication signal 502. In response to receiving the read communication signal 502, the first communication device, or end unit, transmits a response signal 503. The base unit may transmit a read access information communication 504 in response to receiving the response signal 503 from the end unit. The end unit may transmit a response signal 505 to the information communication signal 504 from the base unit. The base unit may transmit a communication/request for registration information 506. In response to the communication for the registration information the end unit may transmit registration information 507 to the base unit. The base unit may transmit a communication/request for configuration settings 508. The end unit may respond with the configuration settings 509. In response to a determination by the base unit that the end unit needs updated configuration settings, the base unit may send one or more new configuration settings 510. The end unit may transmit a confirmation signal 511 to confirm receipt of the one or more new configuration settings.

Figure 5D:
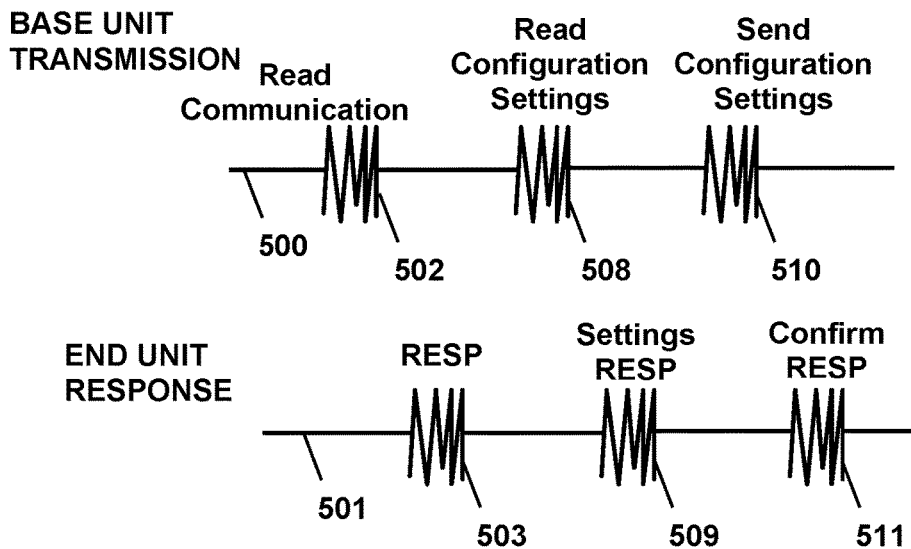

FIG. 5D illustrates a situation similar to that illustrated in FIG. 5C, but for a situation where the end unit is already registered with the base unit. The second communication device, or base unit, may transmit a read communication signal 502. In response to receiving the read communication signal 502, the first communication device, or end unit, transmits a response signal 503. In response to a determination that the end unit is already registered with the base unit, the base unit may transmit a communication/request for configuration settings 508. The end unit may respond with the configuration settings 509. In response to a determination by the base unit that the end unit needs updated configuration settings, the base unit may send one or more new configuration settings 510. The end unit may transmit a confirmation signal 511 to confirm receipt of the one or more new configuration settings.

Referring to FIG. 3, in some implementations, the secondary communication link 316 may include a radio frequency identification (RFID) communication link. The secondary communication link component 322 of the second communication device 302, or base unit, may include an RFID reader. The secondary communication link component 324 of the first communication device 304, or end unit, may include an RFID transponder. The secondary communication link component 324, or RFID transponder, of the end unit may remain idle until it is activated by an RFID reader of the base unit. In response to receipt of a read communication and/or identification communication by the RFID reader in the base unit, the RFID transponder may respond with a signal comprising identification information 326, such as a serial number or code, of the RFID transponder. The identification of the RFID transponder may correlate with the identification of the end unit.

The base unit may cross-reference the identification information with identification stored on the base unit to determine whether the end unit is registered to the base unit. In response to a determination that the end unit is not registered to the base unit, the base unit may register the end unit.

The base unit may obtain the end unit's configuration information from stored information on the base unit, such as in settings storage 336. The base unit may communicate, using the RFID reader, through the secondary communication link 316, a communication/request for configuration information associated with the end unit. The configuration settings may be stored on the secondary communication link component 324 of the first communication device 304. The configuration settings may be stored in setting storage 340. The controller 338 of the first communication device 304 may be configured facilitate sending of the configuration settings to the second communication device 302, over the secondary communication link 316.

The base unit may make a determination as to whether the received configuration settings for the end unit, or first communication device 304, match configuration settings stored on the base unit. In response to a determination that the configuration settings do not match, the base unit controller 328 may cause transmission of updated configuration settings to the second communication device 304, or end unit over the secondary communication link 316. The updated configuration settings may be stored on the RFID transponder of the end unit. The updated configuration settings may be stored in settings storage 340 of the end unit.

The controller 338 of the end unit may be configured to operate the end unit in accordance with the updated settings.

In some implementations, the base unit may not receive the current configuration settings before sending updated configuration settings. The base unit may send configuration settings to the end unit to supersede the current configuration settings on the end unit in response to identifying the end unit.

The first communication device 304, or end unit, may be configured to configure and/or process the configuration settings of the first communication device 304. The controller 338 of the first communication device 304 may be configured to process signals received through the secondary communication link antenna 320 of the first communication device 304 from the second communication device 302.

In some implementations, the signals received by the first communication device 304, received over the secondary communication link 316, may be decoded by the secondary communication link component 324. In other implementations, the signals received by the first communication device 304, received over the secondary communication link 316, may be decoded by the controller 338.

Figure 6:
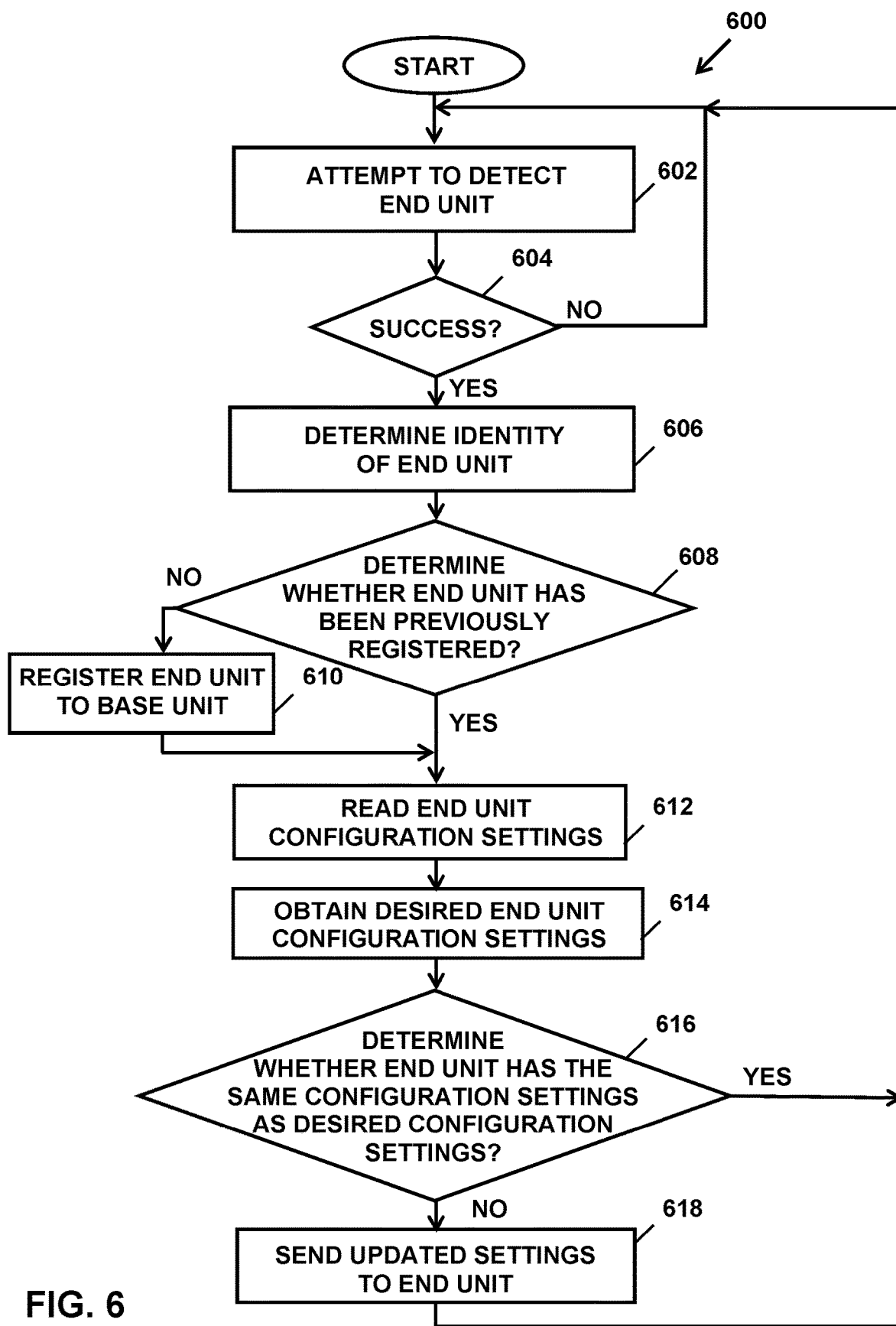
FIG. 6 illustrates a process for configuring a first communication device where the processing occurs in the second communication device, in accordance with one or more implementations of the present disclosure.
Figure 7:
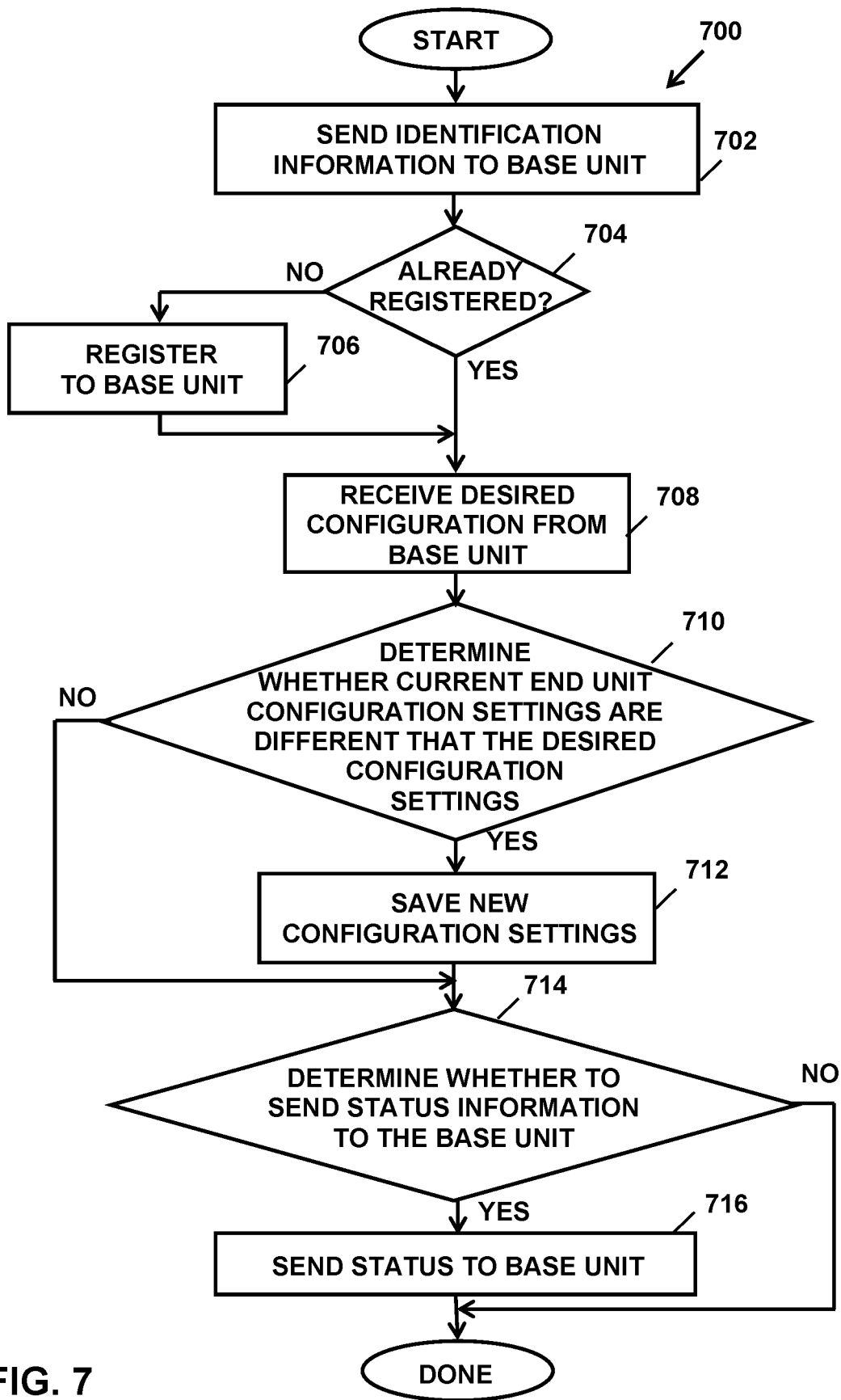
FIG. 7 illustrates a process for configuring a first communication device where the processing occurs in the first communication device, in accordance with one or more implementations of the present disclosure; and, FIG. 8 illustrates a process for handling signals transmitted over secondary communication links between the first and second communication devices, in accordance with one or more implementations of the present disclosure.
Figure 8:
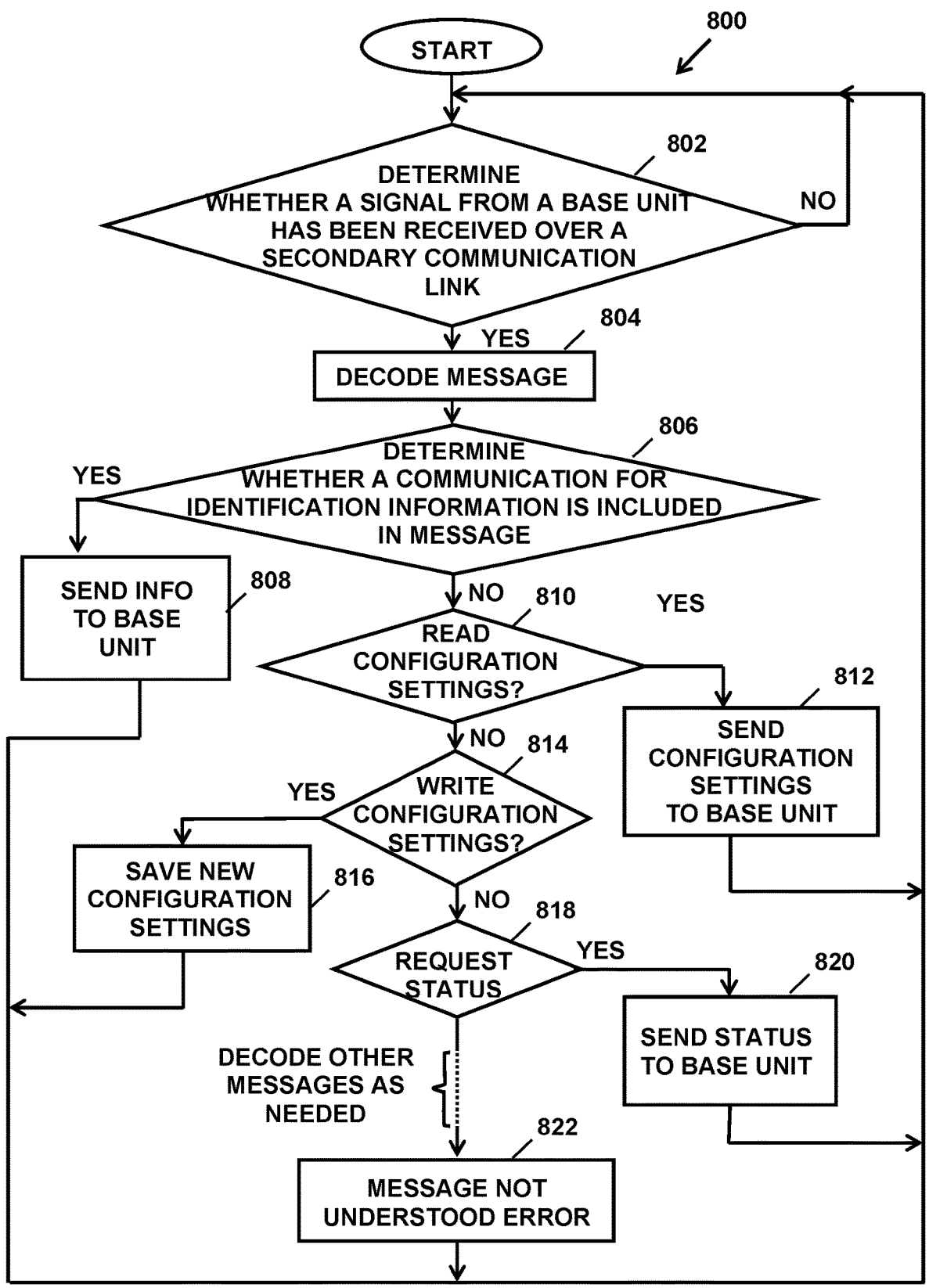

FIGS. 6-8 illustrate processes 600, 700 and 800 that may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of processes 600, 700 and/or 800 in response to instructions stored electronically on an electronic storage medium. The one or more processing devices may include one or more devices configured through hardware, firmware, and/or software to be specifically designed for execution of one or more of the operations of processes 600, 700 and/or 800.

The operations of processes 600, 700 and/or 800 presented below are intended to be illustrative. In some implementations, processes 600, 700 and/or 800 may be accomplished with one or more additional operations not described, and/or without one or more of the operations discussed. Additionally, the order in which the operations of processes 600, 700 and/or 800 are illustrated in FIGS. 6-8 and described below is not intended to be limiting.

FIG. 6 illustrates a process 600 for configuring a first communication device where the processing occurs in the second communication device, in accordance with one or more implementations of the present disclosure.

At an operation 602, a communication device attempts to detect a nearby communication device by sending an identification communication. The nearby communication device may be referred to as the first communication device or end unit. The communication device attempting the detection may be referred to as the second communication device or base unit.

At an operation 604, a determination may be made whether or not a communication for information from any nearby communication devices has been successful. In response to a determination, at operation 604, that the communication for information from any nearby communication devices has not been successful, the functions starting at an operation 602 may be repeated.

At an operation 606, in response to a determination, at operation 604, that the communication for information from any nearby communication devices has been successful, a determination of the identity of the first communication device, or end unit, may be made.

At an operation 608, in response to a determination of the identity of the first communication device, or end unit, a determination may be made whether the identified end unit has been previously registered to the base unit.

At an operation 610, in response to a determination that the identified end unit has not been previously registered to the base unit, the base unit may register the identified end unit.

At an operation 612, in response to a determination that the end unit is registered to the base unit at an operation 608, or in response to registration of the end unit to the base unit at an operation 610, the base unit may obtain configuration settings of the identified end unit.

At an operation 614, the base unit may obtain desired configuration settings for the end unit.

At an operation 616, the base unit may determine whether the identified end unit has the same configuration settings as the desired end unit configuration settings.

In response to a determination at operation 616 that the end unit has the same configuration settings as the desired end unit configuration settings, the base unit may attempt to identify another nearby communication device and repeat the process from operation 602.

At an operation 618, in response to a determination that the settings of the end unit are not the same as the desired end unit settings, the base unit may send updated configuration settings to the end unit.

FIG. 7 illustrates a process 700 for configuring a first communication device, or end unit, where some processing occurs in the first communication device, or end unit, in accordance with one or more implementations of the present disclosure.

At an operation 702, an end unit may send identification information associated with the end unit, to the base unit. The identification information may be sent in response to an identification communication from a base unit.

At an operation 704, in response to an indication from the base unit that the base unit has received the identification information from the end unit, a determination may be made as to whether or not the end unit is registered to the base unit.

At an operation 706, in response to a determination that the end unit is not registered to the base unit, the end unit may be registered to the base unit.

At an operation 708, in response to a determination that the end unit is registered to the base unit, either previously registered or registered at an operation 706, desired end unit configuration settings may be obtained from the base unit.

At an operation 710, a determination may be made by the end unit as to whether the current end unit configuration settings are different than the desired configuration settings.

At an operation 712, in response to a determination that the current configuration settings of the end unit are different from the desired configuration settings of the end unit obtained from the base unit, the end unit may save new configuration settings.

At an operation 714, a determination is made as to whether to send status information to the base unit is made by the end unit.

At an operation 716, in response to a determination that the status of the end unit should be sent to the base unit, the end unit may transmit status information of the end unit to the base unit.

FIG. 8 illustrates a process 800 for the way an end unit may handle signals transmitted over secondary communication links between the first and second communication devices, in accordance with one or more implementations of the present disclosure.

At an operation 802, a determination may be made by an end unit as to whether a signal from a base unit has been received by an end unit over a secondary communication link.

At an operation 804, in response to determining that a signal from a base unit has been received, the signal may be decoded by the end unit.

At an operation 806, a determination may be made as to whether a communication for identification information is included in the decoded signal.

At an operation 808, in response to a determination, at operation 806, that the decoded signal included a communication for identification information, the end unit may send identification information over a secondary communication link to the base unit.

At an operation 810, in response to a determination, at operation 806, that the decoded signal did not include a communication for identification information, a determination may be made as to whether the decoded signal contained a communication for the current configuration settings of the end unit.

At operation 812, in response to a determination that the decoded signal received over the secondary communication link from the base unit, at operation 810, included a communication for configuration settings of the end unit, the configuration settings may be transmitted, by the end unit, to the base unit, over a secondary communication link between the end unit and the base unit.

At operation 814, in response to a determination, at operation 810, that the decoded signal did not include a communication for configuration settings, a determination may be made as to whether the signal included configuration settings for the end unit.

At operation 816, in response to a determination that the decoded signal contained configuration settings for the end unit, the end unit may save the configuration settings and amend the settings of the end unit in accordance therewith.

At operation 818, in response to a determination that the decoded signal did not contain configuration settings at operation 814, a determination may be made as to whether the decoded signal contains a communication/request to obtain a status from the end unit.

At operation 820, in response to a determination that the decoded signal included a communication/request for a status of the end unit, the end unit may send status information to the base unit.

At operation 822, in response to the end unit not recognizing or not being able to read the signal received from the base unit over the secondary communication link, the end unit may transmit an error message to the base unit.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A base station of a communication system, wherein the communication system includes the base station and one or more portable end units, the base station comprising:

electronic storage media configured to electronically store information, wherein the stored information includes configuration settings for communication over one or more communication links between the base station and the one or more portable end units; and one or more physical processors configured by machine-readable instructions to:

responsive to a portable end unit being in proximity to the base station, receive, over a secondary communication link, information from the portable end unit of the communication system, wherein the secondary link is a Near-Field Communication (NFC) link, and wherein the received information identifies the portable end unit;

determine whether the portable end unit is currently registered to the base station, wherein determination is based on the received information;

responsive to determining the portable end unit is not registered to the base station, register the portable end unit to the base station, wherein registering the portable end unit is based on the information received over the NFC link;

obtain a set of configuration settings for communication over a primary communication link between the portable end unit and the base station, wherein the primary communication link is different from the secondary communication link, wherein the communication over the primary communication link includes two-way audio communication; and transmit information related to the set of configuration settings from the base station to the portable end unit, causing the portable end unit to facilitate the two-way audio communication between the base station and the portable end unit over the primary communication link.

2. The base station of claim 1, wherein the one or more physical processors are configured to receive the information from the portable end unit in response to a communication sent from the base station to the portable end unit, wherein the communication is sent over the secondary communication link.

3. The base station of claim 1, wherein the configuration settings are stored in a look-up table in the electronic storage media, wherein the set of configuration settings is obtained by using the received information to access the look-up table.

4. The base station of claim 1, wherein the set of configuration settings is stored in the electronic storage media, wherein the information related to the set of configuration settings is transmitted over the secondary communication link, and wherein the two-way audio communication between the base station and the portable end unit over the primary communication link is in accordance with the transmitted information.

5. The base station of claim 1, wherein the set of configuration settings is obtained from the portable end unit over the secondary communication link.

6. The base station of claim 1, wherein the one or more physical processors of the base station are further configured to:

obtain a set of current configuration settings for the portable end unit;

compare the set of current configuration settings of the portable end unit with the set of configuration settings;

determine one or more adjustments for the set of current configuration settings, wherein the determination of the one or more adjustments is based on the comparison;

transmit, over the secondary communication link, the one or more adjustments from the base station to the portable end unit; and cause the portable end unit to be configured in accordance with the one or more transmitted adjustments.

7. The base station of claim 1, wherein the set of configuration settings is determined through selection and/or entry, at the base station.

8. The base station of claim 1, wherein the portable end unit includes one or more user-operable buttons, and wherein the communication over the primary communication link includes information captured by the one or more user-operable buttons of the portable end unit.

9. The base station of claim 1, wherein the set of configuration settings is further based on one or more sets of configuration settings for other communication devices in the communication system that have been previously configured.

10. The base station of claim 1, wherein the base station comprises one or more remote communication devices for communicating over the secondary communication link, wherein the one or more remote communication devices have location information associated with them, and wherein the set of configuration settings is further based on the location information of the one or more remote communication devices.

11. The base station of claim 1, further comprising a first antenna configured for communication over the primary communication link, and a second antenna configured for communication over the secondary communication link.

12. The base station of claim 1, wherein the set of configuration settings is further based on information obtained by the base station through a network connection.

13. The base station of claim 1, wherein the one or more physical processors of the base station are further configured to obtain information representing one or both of an identity and/or a role of a user of the portable end unit, and wherein the set of configuration settings is further based on the obtained information.

14. A method for configuring portable end units within a communication system that includes a base station and one or more portable end units, wherein the portable end units include an portable end unit, the method being implemented by one or more physical processors that are configured to execute computer-readable instructions to perform the method, the method comprising:

electronically storing information in electronic storage media, wherein the stored information includes configuration settings for communication over one or more communication links between the base station and the one or more portable end units;

responsive to a portable end unit being in proximity to the base station, receiving, over a secondary communication link, information from the portable end unit of the communication system, wherein the secondary link is a Near-Field Communication (NFC) link, and wherein the received information identifies the portable end unit;

determining whether the portable end unit is currently registered to the base station, wherein determination is based on the received information;

responsive to determining the portable end unit is not registered to the base station, registering the portable end unit to the base station, wherein registering the portable end unit is based on the information received over the NFC link;

obtaining a set of configuration settings for communication over a primary communication link between the portable end unit and the base station, wherein the primary communication link is different from the secondary communication link, wherein the communication over the primary communication link includes two-way audio communication;

transmitting information from the base station to the portable end unit, wherein the transmitted information is related to the set of configuration settings for the portable end unit; and causing the portable end unit to facilitate communication between the base station and the portable end unit over the primary communication link.

15. The method of claim 14, further comprising:

sending a communication from the base station to the portable end unit over the secondary communication link, wherein receiving the information from the portable end unit occurs in response to the sending of the communication.

16. The method of claim 14, wherein the configuration settings are stored in a look-up table in the electronic storage media, wherein the set of configuration settings is obtained by using the received information to access the look-up table.

17. The method of claim 14, the set of configuration settings is stored in the electronic storage media, wherein the information related to the set of configuration settings is transmitted over the secondary communication link, and wherein the two-way audio communication between the base station and the portable end unit over the primary communication link is in accordance with the transmitted information.

18. The method of claim 14, wherein the set of configuration settings is obtained from the portable end unit over the secondary communication link.

19. The method of claim 14, further comprising:

obtaining a set of current configuration settings for the portable end unit;

comparing the set of current configuration settings of the portable end unit with the set of configuration settings;

determining one or more adjustments for the set of current configuration settings, wherein the determination of the one or more adjustments is based on the comparison;

transmitting, over the secondary communication link, the one or more adjustments from the secondary communication device to the portable end unit; and causing the portable end unit to be configured in accordance with the one or more transmitted adjustments.

20. The method of claim 14, wherein determining the set of configuration settings includes receiving entry and/or selection by a user at the base station.

21. The method of claim 14, wherein the base station includes one or more remote communication devices for communicating over the secondary communication link, the method further comprising:

associating location information with the one or more remote communication devices, wherein the set of configuration settings is further based on the location information of the one or more remote communication devices.

22. The method of claim 14, further comprising:

obtaining information representing one or both of an identity and/or a role of a user of the portable end unit, wherein the set of configuration settings is further based on the obtained information.

\* \* \* \* \*